United States Patent
Dasher et al.

(10) Patent No.: US 12,223,604 B2
(45) Date of Patent: Feb. 11, 2025

(54) EFFECT DISPLAY BASED ON TEXT RECOGNITION AND ROOM SCALING WITHIN AN AUGMENTED REALITY ENVIRONMENT

(71) Applicant: Adeia Guides, Inc., San Jose, CA (US)

(72) Inventors: Charles Dasher, Lawrenceville, GA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 103 days.

(21) Appl. No.: 18/082,113

(22) Filed: Dec. 15, 2022

(65) Prior Publication Data

US 2024/0203060 A1  Jun. 20, 2024

(51) Int. Cl.
| | | |
|---|---|---|
| G06T 15/00 | (2011.01) | |
| G06T 13/00 | (2011.01) | |
| G06T 19/00 | (2011.01) | |
| G06V 10/74 | (2022.01) | |
| H04L 51/046 | (2022.01) | |

(52) U.S. Cl.
CPC .......... *G06T 19/006* (2013.01); *G06T 13/00* (2013.01); *G06V 10/761* (2022.01); *H04L 51/046* (2013.01)

(58) Field of Classification Search
CPC ..... G06T 19/006; G06T 13/00; H04L 51/046; G06V 10/761
USPC ......................................................... 345/418
See application file for complete search history.

(56) References Cited

U.S. PATENT DOCUMENTS

| | | | | |
|---|---|---|---|---|
| 11,948,263 | B1* | 4/2024 | Rudman | G06V 20/20 |
| 12,022,144 | B2* | 6/2024 | Harviainen | H04N 21/2662 |
| 2018/0349108 | A1* | 12/2018 | Brebner | G06F 9/451 |
| 2023/0006889 | A1* | 1/2023 | Thyagaturu | H04L 41/5054 |
| 2023/0078448 | A1* | 3/2023 | Cella | G06Q 10/06311 |
| | | | | 705/7.13 |
| 2023/0139626 | A1* | 5/2023 | Berliner | G06F 1/1694 |
| | | | | 345/156 |
| 2024/0078004 | A1* | 3/2024 | Qian | G06F 3/0482 |
| 2024/0112428 | A1* | 4/2024 | Levi | G02B 27/017 |
| 2024/0203060 | A1* | 6/2024 | Dasher | G06T 19/006 |
| 2024/0203061 | A1* | 6/2024 | Dasher | G06T 19/006 |

OTHER PUBLICATIONS

Jo D, Kim GJ. AR enabled IoT for a smart and interactive environment: A survey and future directions. Sensors. Oct. 7, 2019;19(19):4330.*

(Continued)

*Primary Examiner* — Phu K Nguyen
(74) *Attorney, Agent, or Firm* — Haley Guiliano LLP

(57) ABSTRACT

Systems and methods are provided herein for detecting key words provided by ancillary devices and acquiring virtual objects based on the detected key words. This may be accomplished by a system displaying an augmented reality view to a user and detecting a received message. The system can determine whether a portion of the message corresponds to an augmented reality object. In response to detecting that the portion of the message corresponds to the augmented reality object, the system can display the augmented reality object in the augmented reality view in a first format. The first format can be based on the environment around the user.

17 Claims, 13 Drawing Sheets

(56) References Cited

OTHER PUBLICATIONS

Jeong Y, Joo H, Hong G, Shin D, Lee S. AVIoT: Web-based interactive authoring and visualization of indoor internet of things. IEEE Transactions on Consumer Electronics. Aug. 2015;61(3):295-301.*
Guan J, Irizawa J, Morris A. Extended reality and internet of things for hyper-connected metaverse environments. In2022 IEEE Conference on Virtual Reality and 3D User Interfaces Abstracts and Workshops (VRW) Mar. 12, 2022 (pp. 163-168). IEEE.*
Kim JC, Laine TH, Åhlund C. Multimodal interaction systems based on internet of things and augmented reality: A systematic literature review. Applied Sciences. Feb. 16, 2021;11(4):1738.*
Makolkina M, Koucheryavy A, Paramonov A. The models of moving users and IoT devices density investigation for augmented reality applications. InInternet of Things, Smart Spaces, and Next Generation Networks and Systems: 17th International Conference, NEW2AN 2017, 10th Conference, ruSMART 2017, Third Workshop NsCC.*
Siripongdee K, Tuntiwongwanich S, Pimdee P. Blended Learning Model with IoT-based by Smartphone. Int. J. Interact. Mob. Technol . . . Jun. 2021;15(11):166.*
Syahidi AA, Arai K, Tolle H, Supianto AA, Kiyokawa K. Augmented Reality in the Internet of Things (AR+ IoT): A Review. The IJICS (International Journal of Informatics and Computer Science). Nov. 30, 2021;5(3):258-65.*
U.S. Appl. No. 18/082,117, filed Dec. 15, 2022, Charles Dasher.

* cited by examiner

200

EFFECT DISPLAY BASED ON TEXT RECOGNITION AND ROOM SCALING WITHIN AN AUGMENTED REALITY ENVIRONMENT

BACKGROUND

The present disclosure relates to augmented reality, and in particular to techniques for displaying an object in augmented reality.

SUMMARY

Advancements in media technology have led to the development of extended reality technologies, such as augmented reality (AR). AR overlays comprise content and information with respect to attributes of the physical environment surrounding the user. AR devices and overlays paired together enable devices to enhance a user's experience with media content such that the user experiences their surroundings and content simultaneously. An AR overlay enables the user to view the real world with an additional interactive layer of digital information projected into it (e.g., the overlay may be at least partially transparent to enable a user to remain aware of their surroundings while consuming content). The AR overlay may comprise two-dimensional or three-dimensional virtual objects as part of an interactive interface within the user's field of view (e.g., using an AR headset or a screen of a device enabled to present video corresponding to the user's surroundings). Current AR systems fail to fully utilize information provided by other devices to improve the AR environment displayed for the user. For example, most AR systems lack the ability to supplement or enhance messages, pictures, and alarms displayed on a second device within the AR environment. In view of these deficiencies, there exists a need for improved systems and methods for generating virtual objects based on detecting information provided by devices within the displayed AR environment.

Accordingly, techniques are disclosed herein for detecting key words provided by ancillary devices and acquiring virtual objects based on the detected key words. For example, an AR device may display an AR environment for a user. The AR device may also communicate with one or more additional devices (e.g., smartphones, tablets, desktops, televisions, etc.) over a wired or wireless communication protocol. For example, the AR device may use Bluetooth to pair with a smartphone that is within a threshold distance of the user. The AR device may determine whether information on a first additional device corresponds to a virtual object. For example, the AR device may determine that the first additional device received a message. The AR device may perform image and/or text recognition on the received message to determine whether the message comprises a word or phrase corresponding to a virtual object. If the AR device determines that information on the first additional device corresponds to a virtual object, the AR device displays the virtual object in a first format in the AR environment.

In some embodiments, the AR device uses one or more factors when determining a format for displaying the virtual object. For example, the AR device may use one or more environment characteristics relating to the space around the AR device to determine a format of the virtual object. The AR device may display the virtual object in a first format if the AR device determines that the AR device is indoors and may display the virtual object in a second format if the AR device determines that the AR device is outdoors. The animation of the virtual object in the first format may be smaller than the animation of the virtual object in the second format because there is more space in the outdoor environment. In another example, the AR device may display the virtual object in a first format if the AR device determines that the AR device is in a vehicle and may display the virtual object in a second format if the AR device determines that the AR device is not in a vehicle. The virtual object in the first format may have no animation and may just be an icon to avoid distracting a user while driving and the virtual object in the second format may be animated. In another example, the AR device may display the virtual object in a first format if the AR device determines that the additional device is in a first orientation and may display the virtual object in a second format if the AR device determines that the additional device is in a second orientation. The virtual object in the first format may have animation vectors originating from the additional device in the first orientation while the virtual object in the second format may have animation vectors originating from the additional device in the second orientation. Changing the format of the virtual object depending on the orientation of the additional device allows for a more realistic user experience. Additionally, the user may change the orientation of the additional device to view the virtual object in different formats.

A first device may indicate whether a second device is associated with a user using an AR device. For example, a first device may receive one or more inputs (e.g., a second user typing a message) corresponding to a message. The first device may determine (e.g., using image and/or text recognition on the message) whether a portion of the message comprises a word or phrase corresponding to a virtual object. The first device may also determine that the recipient of the message is a second device. The first device may receive a device characteristic associated with the second device. In some embodiments, the device characteristic indicates whether a user associated with the second device is using an AR device. For example, the second device may communicate (e.g., using Bluetooth, Wi-Fi, and/or similar such communication methods) with one or more AR devices and determine that the one or more AR devices are displaying an AR environment for the user. The second device itself can be an AR device (e.g., AR glasses) that can display text, audio and video messages to the user (e.g., via installed messaging apps) or the second device can act as an extension to another user device (e.g., a phone) where the second device receives and displays content that was sent to the phone. In another example, the second device is associated with a profile. In some embodiments, one or more devices (e.g., the second device) are associated with the profile. The profile may indicate whether any of the devices associated with the profile are displaying an AR environment, whether they have AR capabilities, and whether the AR device(s) are online. In some embodiments, if a user is wearing the AR device (e.g., AR glasses), then such status is also sent to the first device. Accordingly, the AR device may use the profile to determine if the user is using an AR device. After determining that the user is using an AR device, the second device may transmit a device characteristic (e.g., indicating that the user is using an AR device) to the first device.

In response to the first device determining that a portion of the message for the second device comprises a word or phrase corresponding to a virtual object and that a user associated with the second device is using an AR device, the first device may display an option to send the message with the virtual object. In some embodiments, the first device also displays an example of how the virtual object will look when displayed by the AR device. If the option to send the message with the virtual object is selected, the first device transmits the message along with an indicator to the second device. The indicator may indicate that a portion of the message corresponds to a virtual object. The AR device may display the virtual object for the user based on the second device receiving the indicator. The indicator may be metadata associated with the message and/or may comprise information about the virtual object. If the first device determines that a portion of the message for the second device comprises a word or phrase corresponding to a virtual object, but the user associated with the second device is not using an AR device, the first device may not display an option to send the message with the virtual object because there is no way for the user to currently view the virtual object.

In some embodiments, the first device may use a received device characteristic to generate the display of the example of the virtual object. For example, if a device characteristic indicates that the AR device is indoors, the first device may generate an example of the virtual object in a first format in an enclosed environment. In another example, if a device characteristic indicates that the AR device is outdoors, the first device may generate an example of the virtual object in a second format in an outdoor environment.

BRIEF DESCRIPTION OF THE DRAWINGS

The below and other objects and advantages of the disclosure will be apparent upon consideration of the following detailed description, taken in conjunction with the accompanying drawings in which.

DETAILED DESCRIPTION

Figure 1:
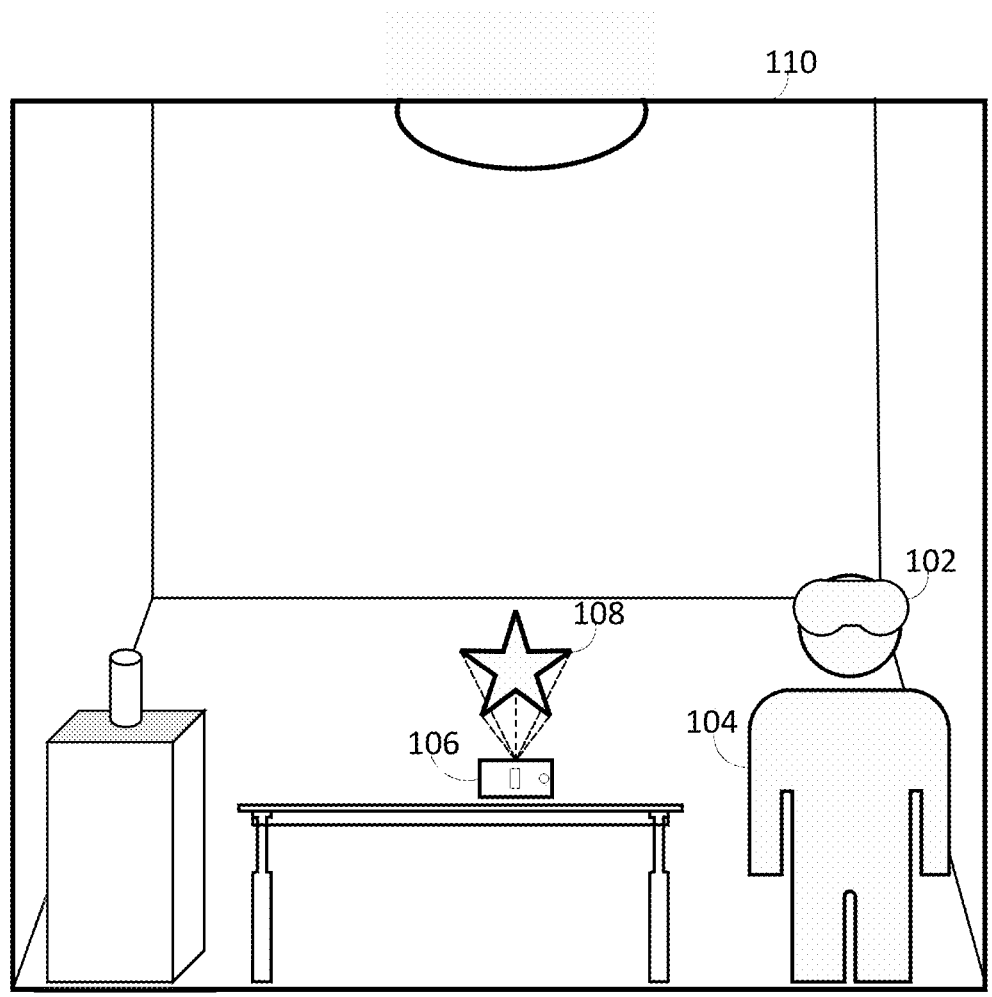
FIG. 1 shows an illustrative diagram of a system for detecting key words provided by ancillary devices and acquiring virtual objects based on the detected key words, in accordance with some embodiments of the disclosure.

FIG. 1 shows an illustrative diagram of a system 100 for detecting key words provided by ancillary devices and acquiring virtual objects based on the detected key words, in accordance with some embodiments of the disclosure. System 100 includes a user 104 wearing an AR device 102. Although the AR device 102 is shown as a headset, any device or devices that can display an AR environment may be used. In some embodiments, the AR device 102 is in communication with an additional device 106. The additional device 106 may be a smartphone, tablet, desktop, television, and/or similar such devices. In some embodiments, the AR device 102 communicates with the device 106 using one or more wired and/or wireless communication protocols. For example, the AR device 102 and the additional device 106 may communicate via a Wi-Fi network.

In some embodiments, the AR device 102 uses one or more methods to determine whether one or more events associated with a virtual object 108 occurs. In some embodiments, the one or more events include the additional device 106 receiving a message, typing a message, interacting with an application, and/or similar such events. In some embodiments, the AR device 102 determines that an event associated with the virtual object 108 has occurred by communicating with an Application Programming Interface (API) that notifies that AR device 102 that the additional device 106 is interacting with an application corresponding to the virtual object 108. In some embodiments, the AR device 102 determines that an event associated with the virtual object 108 has occurred when the AR device 102 receives a notification from the additional device 106 indicating the additional device 106 received a message corresponding to the virtual object 108. In some, the AR device 102 determines that an event associated with the virtual object 108 has occurred by using computer vision to detect that the additional device 106 is displaying a message corresponding to the virtual object 108.

In some embodiments, the AR device 102 determines that an event associated with the virtual object 108 has occurred after detecting that the additional device 106 outputs an audio message using one or more speakers. For example, the AR device may detect the additional device outputting "Happy Fourth of July" using one or more speakers.

In some embodiments, the AR device 102 determines that an event corresponding to the virtual object 108 has occurred after comparing a message received by the additional device 106 to a virtual object database. For example, the AR device 102 may perform image and/or text recognition on the received message and cross-references the message or one or more portions of the message with a database linking virtual objects to words, phrases, and/or images. If the AR device 102 determines that the message or one or more portions of the message correspond to a virtual object, the AR device 102 determines that an event corresponding to the virtual object 108 has occurred.

If the AR device 102 determines that an event corresponding to the virtual object 108 has occurred, the AR device 102 displays the virtual object 108 in a first format in the AR environment. In some embodiments, the format corresponds to the size, shape, color, animation, sound, speed, direction, start position, end position, and/or similar such attributes related to the virtual object 108. In some embodiments, the AR device 102 uses one or more factors when determining a format for displaying the virtual object 108. For example, the AR device 102 can use one or more environment characteristics relating to a space 110 around the AR device 102 to determine the format of the virtual object 108. In some embodiments, the AR device 102 uses computer vision, one or more sensors, and/or a profile with stored environment characteristics, to determine environment characteristics. For example, the AR device 102 may use a sensor (e.g., a camera) located on the AR device 102 to capture information about the space 110 and use the information about the space 110 to determine that the that the AR device 102 is indoors (e.g., environment characteristic). The AR device 102 may then determine a first format for the virtual object 108 based on the AR device 102 being indoors. In another example, the AR device 102 may determine whether the AR device 102 is able to connect to a known Wi-Fi network. The AR device may store past Wi-Fi connections in a profile and determine that one or more networks correspond to certain locations. In some embodiments, if the AR device 102 is able to connect to a known Wi-Fi network the AR device 102 determines a location of the AR device 102 using the profile. The AR device 102 may then determine a first format for the virtual object 108 based on the AR device 102 being at the determined location.

In some embodiments, the AR device 102 can use one or more environment characteristics relating to the additional device 106 associated with virtual object 108 to determine the format of the virtual object 108. For example, the AR device 102 may use computer vision to determine the angle of incident (e.g., environment characteristic) between the frontal plane of the AR device 102 and the display of the additional device 106 associated with the virtual object. The AR device 102 may then determine a first format for the virtual object 108 based on the determined angle of incident. In another example, the AR device 102 may receive the orientation of the additional device 106 from the additional device 106. The additional device 106 may use one or more sensors to determine device information (e.g., the orientation of the additional device 106) and send the device information to the AR device 102. The AR device 102 may then determine a first format for the virtual object 108 based on the orientation of the additional device 106.

In some embodiments, the AR device 102 accesses a database with entries associating one or more factors with one or more formats for the virtual object 108. For example, a first entry may associate a first factor (e.g., AR device 102 being indoors) with a first format and a second entry may associate a second factor (e.g., AR device 102 being outdoors) with a second format. In another example, a first entry may associate a first factor (e.g., AR device 102 being indoors) and a second factor (e.g., AR device 102 having a first orientation) with a first format and a second entry may associate the first factor (e.g., AR device 102 being indoors) and a third factor (e.g., AR device 102 having a second orientation) with a second format.

Once the AR device 102 determines a format for the virtual object 108, the AR device 102 displays the virtual object 108 in the AR environment. In some embodiments, the AR device 102 determines the format for the virtual object 108 using a first factor and then displays the virtual object 108 in the determined format according to a second factor. For example, the AR device 102 may determine a size (e.g., first format) of the virtual object 108 based on the AR device 102 being indoors (e.g., first factor). The AR device 102 may then display the virtual object 108 in the AR environment so that the virtual object 108 has the same orientation as the orientation of additional device 106 (e.g., second factor). The AR device 102 displaying the virtual object 108 in the AR environment so that the virtual object 108 has the same orientation as the orientation of the additional device 106 may better simulate that the virtual object 108 is originating from the addition device 106.

Figure 2A:
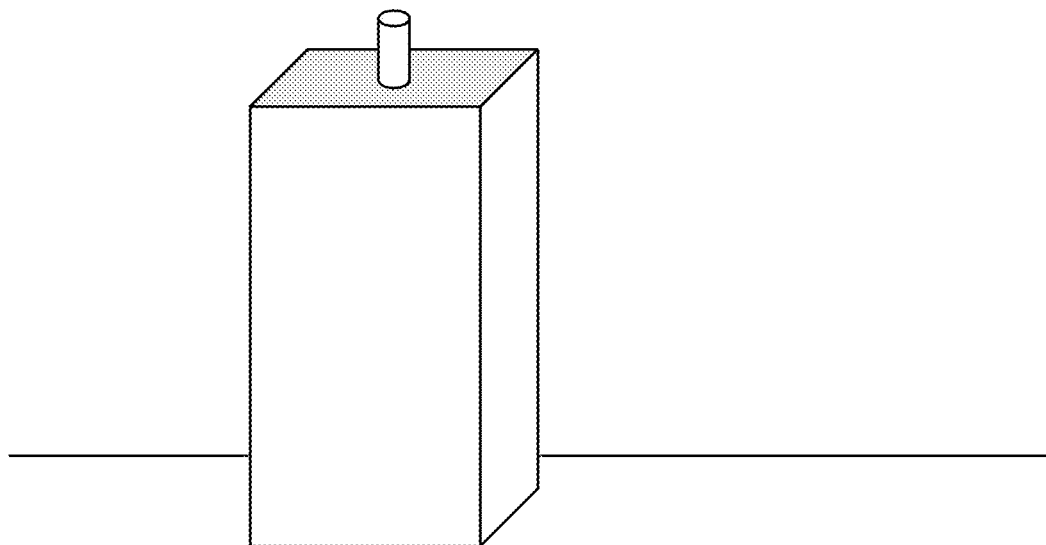
FIGS. 2A-2C show additional illustrative diagrams of a system for detecting key words provided by ancillary devices and acquiring virtual objects based on the detected key words, in accordance with some embodiments of the disclosure.
Figure 2A:
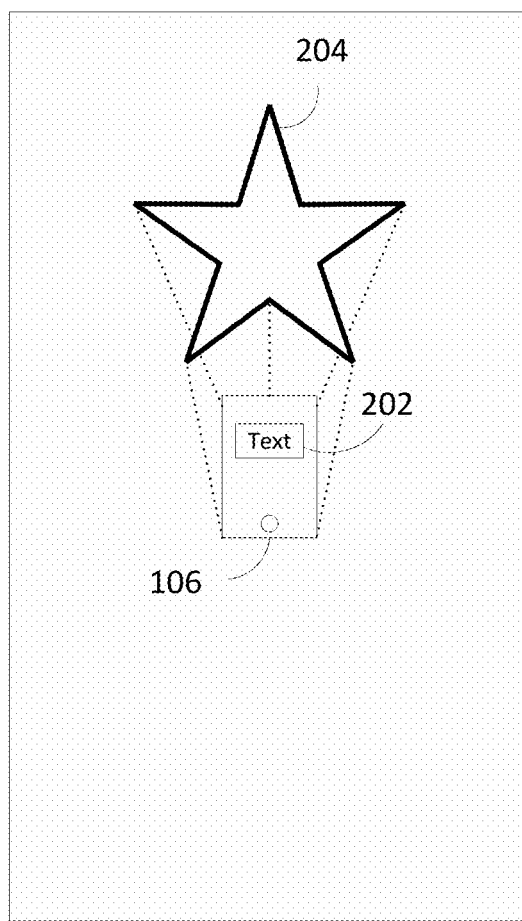
Figure 2B:
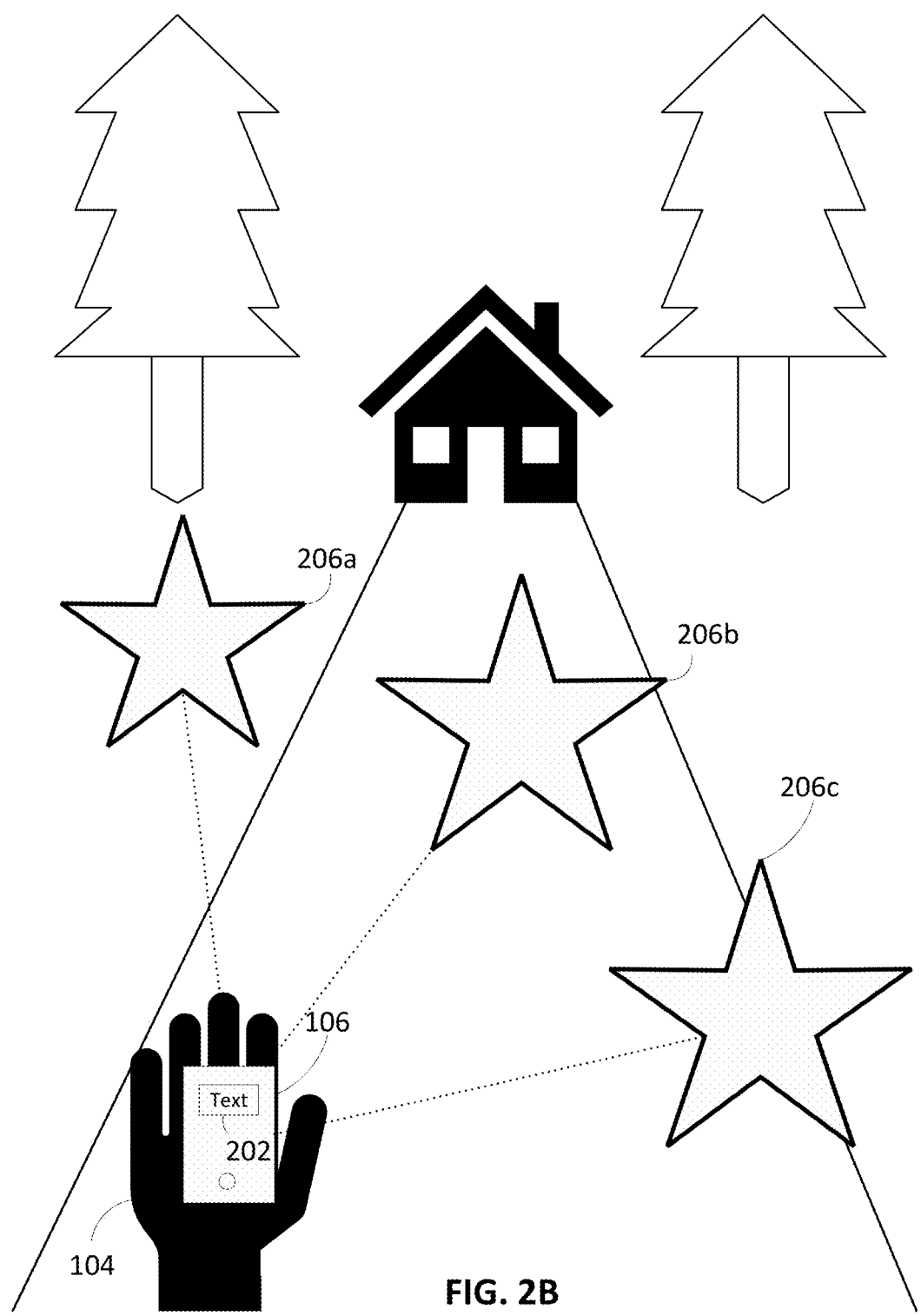
Figure 2C:
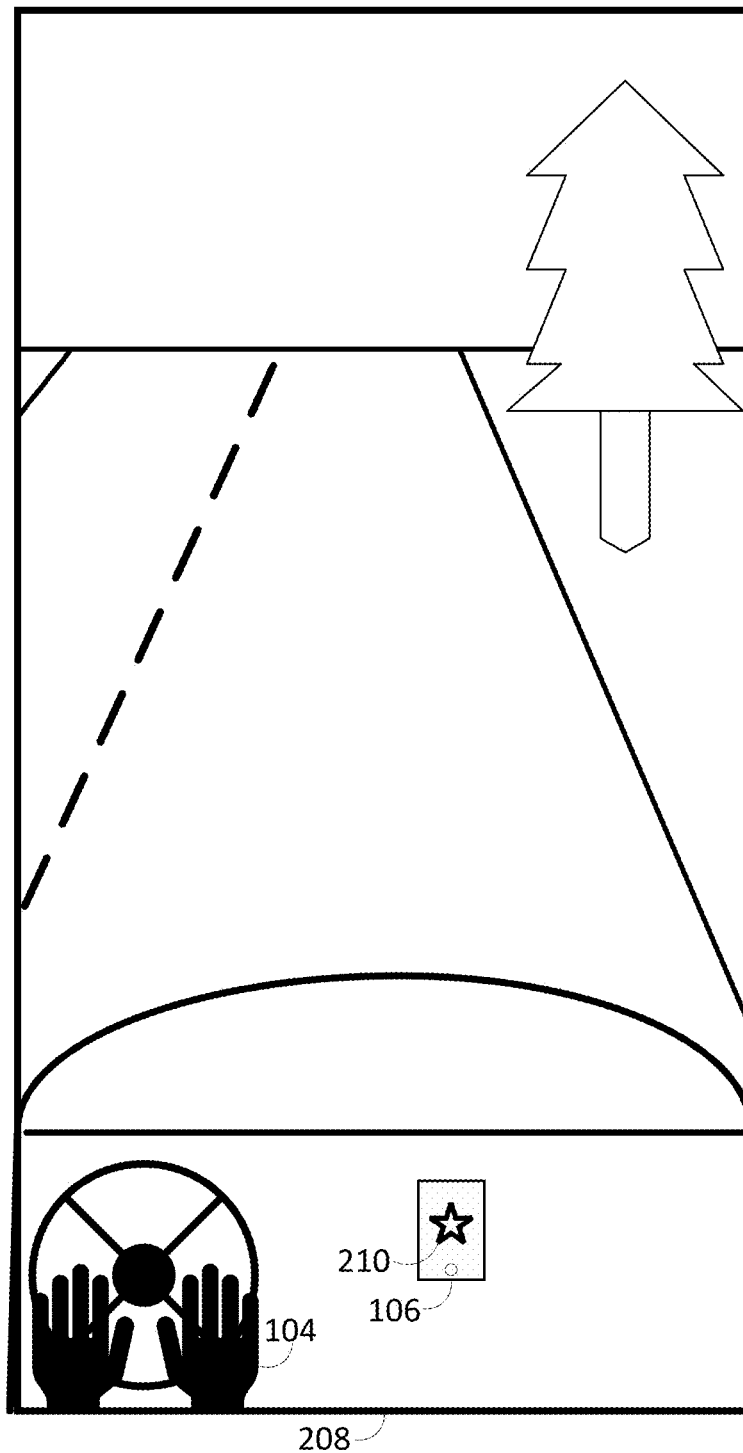

FIGS. 2A-2C show additional illustrative diagrams of a system for detecting key words provided by ancillary devices and acquiring virtual objects based on the detected key words, in accordance with some embodiments of the disclosure. In some embodiments, FIGS. 2A-2C show AR environments displayed by one or more AR devices (e.g., AR device 202). In some embodiments, the one or more AR devices use one or more of the methodologies described in FIG. 1 to display the AR environments.

FIG. 2A illustrates a first AR environment 200 displayed by an AR device. In some embodiments, the first AR environment 200 corresponds to the space 110 described in FIG. 1. In some embodiments, an AR device determines that an event corresponding to a virtual object has occurred after comparing a message 202 received by the additional device 106 to a virtual object database. For example, the AR device may perform image and/or text recognition on the message 202 and cross-reference the message or one or more portions of the message 202 with a database linking virtual objects to words, phrases, and/or images. If the AR device determines that the message 202 or one or more portions of the message 202 correspond to the virtual object, the AR device determines that an event corresponding to the virtual object has occurred.

If the AR device determines that an event corresponding to the virtual object has occurred, the AR device displays the virtual object in a first format 204 in the first AR environment 200. In some embodiments, the AR device uses one or more factors when determining a format for displaying the virtual object. In some embodiments, the AR device uses computer vision, one or more sensors, and/or a profile with stored environment characteristics, to determine environment characteristics. In some embodiments, the AR device uses a sensor (e.g., a camera) located on the AR device to capture information about the space around the AR device and then uses the information about the space around the AR device to determine that the AR device is indoors (e.g., environment characteristic). The AR device may then determine the first format 204 for the virtual object based on the AR device being indoors.

In some embodiments, once the AR device determines the first format 204 for the virtual object, the AR device display the first format 204 of the virtual object in the first AR environment 200. In some embodiments, the AR device determines the first format 204 of the virtual object using a first factor and then displays the virtual object in the first format 204 according to a second factor. For example, the AR device may determine the size and shape of the virtual object based on the AR device being indoors (e.g., first factor). As shown, the AR device may then display the virtual object in the first format 204 in the first AR environment 200 so that the virtual object in the first format 204 has the same orientation as the orientation of additional device 106 (e.g., second factor).

FIG. 2B illustrates a second AR environment 220 displayed by an AR device. In some embodiments, an AR device determines that an event corresponding to a virtual object has occurred after comparing the message 202 received by the additional device 106 to a virtual object database. If the AR device determines that the message 202 or one or more portions of the message 202 correspond to the virtual object, the AR device determines that an event corresponding to the virtual object has occurred.

In some embodiments, if the AR device determines that an event corresponding to the virtual object has occurred, the AR device displays the virtual object in a second format 206*a-c* in the second AR environment 220. In some embodiments, the AR device uses one or more factors when determining a format for displaying the virtual object. In some embodiments, the AR device uses computer vision, one or more sensors, and/or a profile with stored environment characteristics, to determine environment characteristics. In some embodiments, the AR device connects to a network to determine the location of the AR device. For example, the AR device may access a global positioning system to determine the location (e.g., environment characteristic) of the AR device. In some embodiments, the AR device determines the second format 206*a-c* for the virtual object based on the location of the AR device. For example, the location of the AR device may indicate that the AR device is outdoors. The AR device may access a database with a first entry linking the second format 206*a-c* for the virtual object with the environment characteristic associated with the AR device being outdoors. In another example, the location of the AR device may indicate that the AR device is located in a first region (e.g., building, neighborhood, city, state, country, etc.). The AR device may access the database with a second entry linking the second format 206*a-c* for the virtual object with the environment characteristic associated with the first region.

In some embodiments, the second format 206*a-c* for the virtual object comprises more animation and/or larger animations than the first format 204 of the virtual object. In some embodiments, once the AR device determines the second format 206*a-c* for the virtual object, the AR device display the second format 206*a-c* of the virtual object in the second AR environment 220. In some embodiments, the AR device determines the second format 206*a-c* of the virtual object using a first factor and then displays the virtual object in the second format 206*a-c* according to a second factor. For example, the AR device may determine the size and animation of the virtual object based on the AR device being outdoors (e.g., first factor). As shown, the AR device may then display the virtual object in the second format 206*a-c* in the second AR environment 220 so that the virtual object in the second format 206*a-c* originates from the location of the additional device 106 (e.g., second factor).

FIG. 2C illustrates a third AR environment 208 displayed by an AR device. In some embodiments, an AR device determines that an event corresponding to a virtual object has occurred after receiving a notification indicating that a message received by the additional device 106 is associated with a virtual object. For example, the message may comprise metadata indicating that the message is associated with a virtual object. If the AR device receives the notification indicating that a message received by the additional device 106 is associated with a virtual object, the AR device determines that an event corresponding to the virtual object has occurred.

In some embodiments, if the AR device determines that an event corresponding to the virtual object has occurred, the AR device displays the virtual object in a third format 210 in the third AR environment 208. In some embodiments, the AR device uses one or more factors when determining a format for displaying the virtual object. In some embodiments, the AR device uses computer vision, one or more sensors, and/or a profile with stored environment characteristics, to determine environment characteristics. In some embodiments, the AR device determines that the AR device and/or the additional device 106 are moving. For example, the AR device may use sensors (e.g., accelerometers, motion sensors, and/or similar such sensors) to determine that the AR device and/or additional device 106 are in a moving vehicle (e.g., environment characteristic) of the AR device. In some embodiments, the AR device determines the third format 210 for the virtual object based on the AR device being in a moving vehicle.

In some embodiments, the third format 210 for the virtual object is much smaller than the first format 204 and the second format 206*a-c* of the virtual object. In some embodiments, the third format 210 has no animation to avoid distracting the user 104. In some embodiments, the third format 210 is an icon displayed over the contents of the received message. In some embodiments, the AR device does not display the virtual object in the third format until the AR device determines that the vehicle has stopped moving. In some embodiments, the third format 210 of the virtual object is selectable and when the user selects the virtual object in the third format 210 the AR device displays the virtual object in another format (e.g., first format 204). For example, the third format 210 of the virtual object may correspond to an option for a user to indicate that they are riding in a moving vehicle but are not driving. The AR device may display the virtual object in another format (e.g., first format 204) after the user select the option.

Figure 3A:
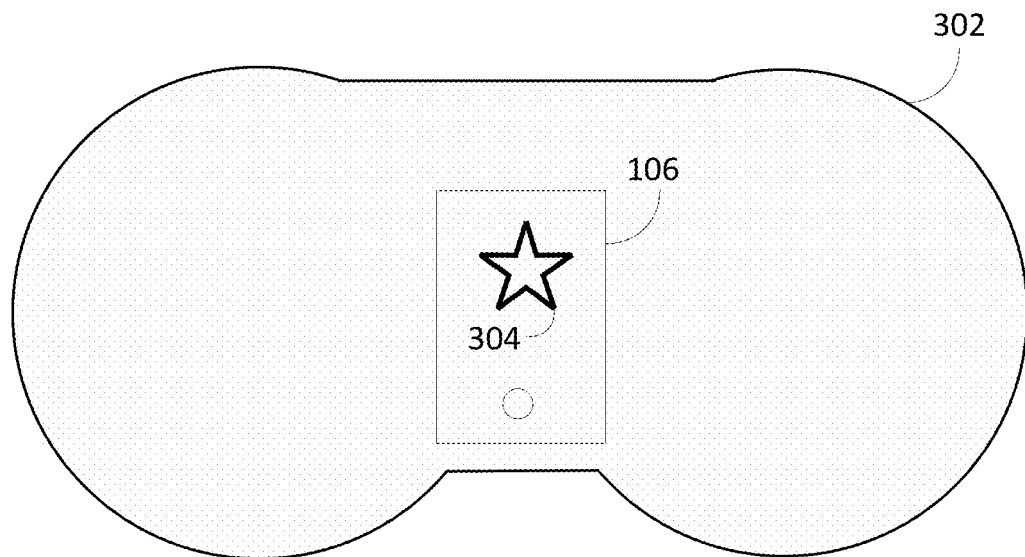
FIGS. 3A and 3B show additional illustrative diagrams of a system for detecting key words provided by ancillary devices and acquiring virtual objects based on the detected key words, in accordance with some embodiments of the disclosure.
Figure 3B:
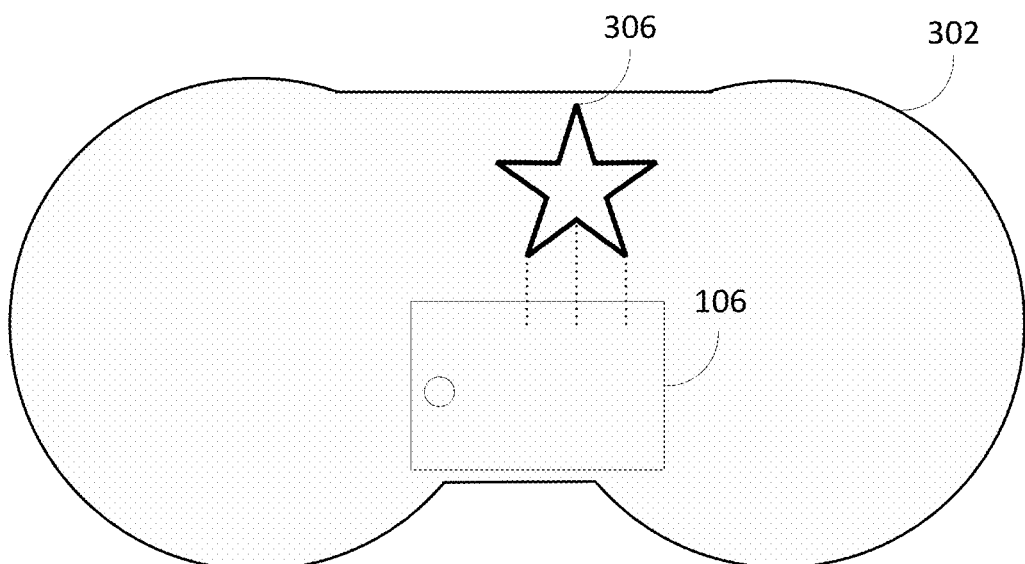

FIGS. 3A and 3B show additional illustrative diagrams of a system for detecting key words provided by ancillary devices and acquiring virtual objects based on the detected key words, in accordance with some embodiments of the disclosure. In some embodiments, an AR device 302 displays an AR environment comprising real-world objects (e.g., additional device 106) and AR objects (e.g., virtual object 306). In some embodiments, the AR device 302 displays the virtual object 306 in response to an action.

FIG. 3A shows the AR device 302 displaying an indication 304 on the display of the additional device 106. In some embodiments, the indication 304 is only displayed by the AR device 302 and is not displayed on the additional device 106 outside of the AR environment. In some embodiments, the indication 304 is also displayed on the screen of the additional device 106 in the real world (outside of the AR environment). In some embodiments, the indication 304 informs the user that a virtual object is available if the user performs an action. For example, the indication 304 may inform the user that a virtual object is available if the user changes the orientation of the additional device 106.

FIG. 3B shows the AR device 302 displaying the virtual object 306 in response to the user changing the orientation of the additional device 106. In some embodiments, the AR device 302 displays the virtual object 306 in response to other actions. For example, the AR device 302 may display the virtual object 306 in response to a user selecting the indication 304 by tapping on the indication 304 on the additional device 106. In another example, the AR device 302 may display the virtual object 306 in response to receiving a voice command (e.g., "Show AR animation") from a user. In another example, the AR device 302 may display the virtual object 306 in response to the user gesturing (e.g., pointing, waving, nodding, winking, blinking, etc.). In some embodiments, the AR device 302 may display the virtual object 306 in response to the additional device 106 entering the field of view of the user. For example, the user may turn the AR device 302 so that the additional device 106 is displayed in the AR environment and the AR device 302 may display the virtual object 306. In some embodiments, the AR device 302 displays the virtual object 306 after a threshold time-period. For example, if the user does not interact with the indication 304 within one minute the AR device 302 may display the virtual object 306.

In some embodiments, the AR device 302 detects one or more of the actions using sensors communicating with the AR device 302. For example, the AR device 302 may use one or more accelerometers housed within the addition device 106 to determine that a user has changed the position of the additional device 106. In another example, the AR device 302 may use one or cameras positioned around the user to determine that a user has gestured (e.g., waved). In another example, the AR device 302 may use computer vision to determine that a user has pointed at the indication 304. In another example, the AR device may receive a notification from the additional device 106 indicating that the user has selected the indication 304 at the additional device 106.

Figure 4A:
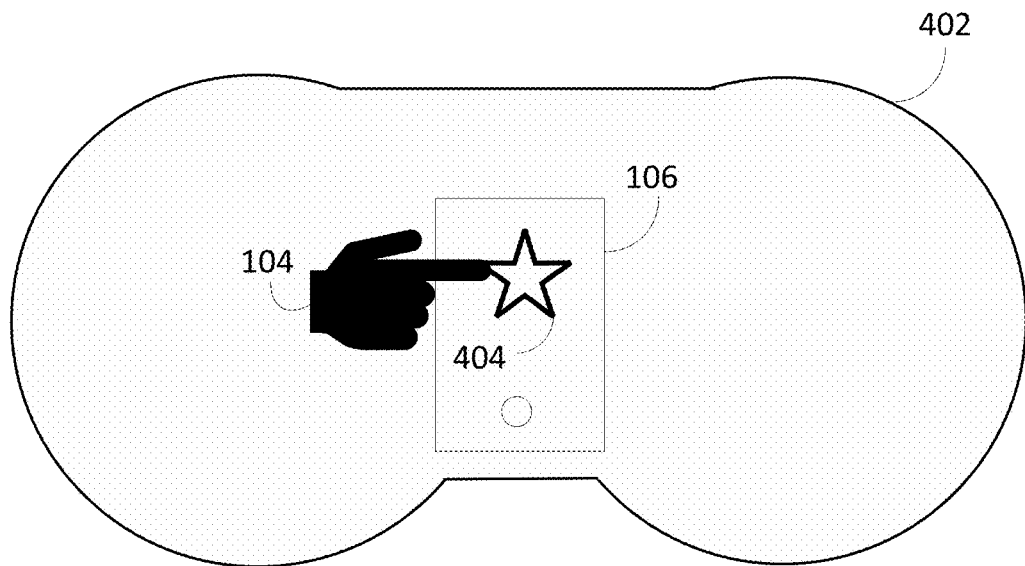
FIGS. 4A and 4B show additional illustrative diagrams of a system for detecting key words provided by ancillary devices and acquiring virtual objects based on the detected key words, in accordance with some embodiments of the disclosure.
Figure 4B:
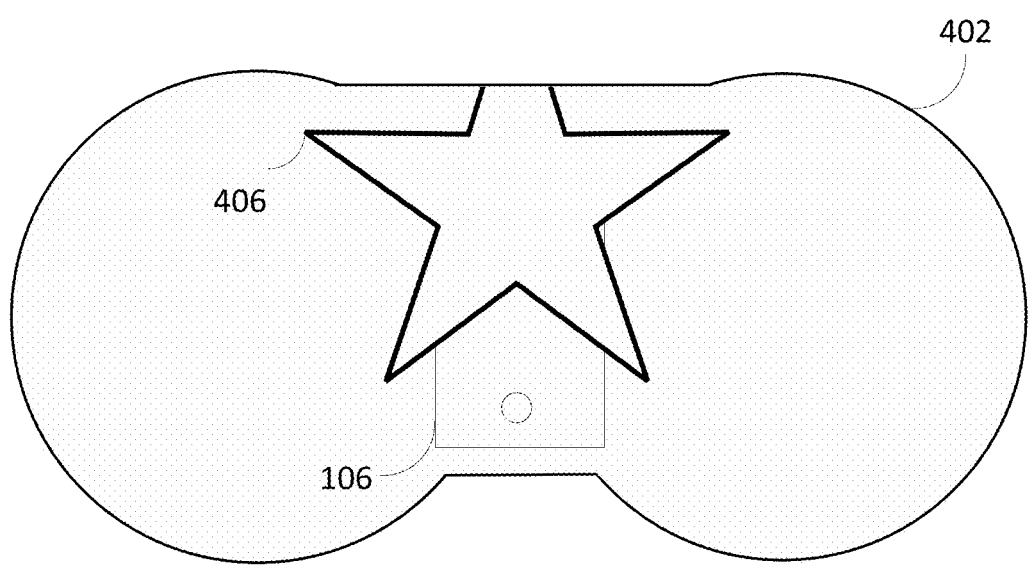

FIGS. 4A and 4B show additional illustrative diagrams of a system for detecting key words provided by ancillary devices and acquiring virtual objects based on the detected key words, in accordance with some embodiments of the disclosure. In some embodiments, an AR device 402 displays an AR environment comprising real-world objects (e.g., additional device 106) and AR objects (e.g., virtual object 406). In some embodiments, the AR device 402 displays the virtual object 406 in response to an action.

FIG. 4A shows the AR device 402 displaying an indication 404 on the display of the additional device 106. In some embodiments, the indication 404 is only displayed by the AR device 402 and is not displayed on the additional device 106 outside of the AR environment. In some embodiments, the indication 404 is also displayed on the screen of additional device 106 in the real world (outside of the AR environment). In some embodiments, a user 104 selects the indication 404. In some embodiments, the user 104 selects the indication 404 by tapping on the display of the additional device 106. In some embodiments, the user 104 selects the indication 404 by pointing at the indication 404. FIG. 4B displays the AR device 402 displaying the virtual object 406 in response to the user's selection of the indication 404.

Figure 5A:
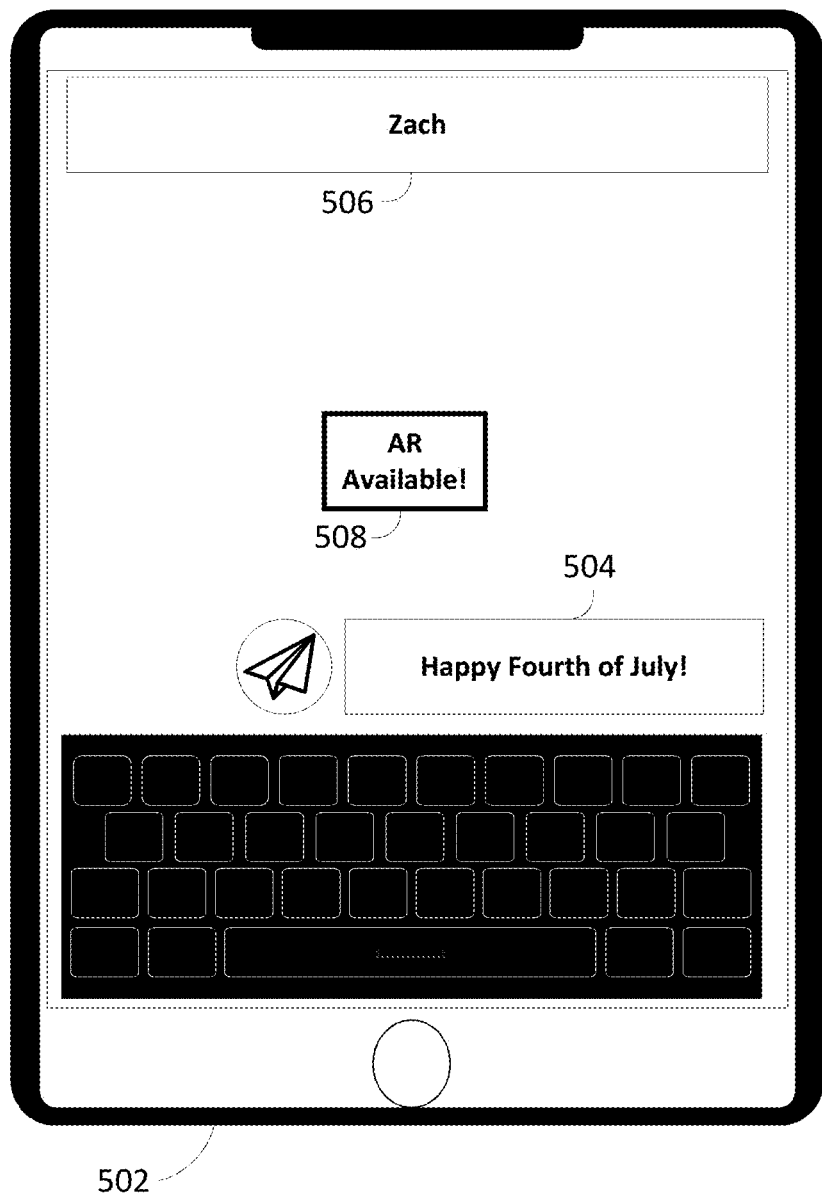
FIGS. 5A and 5B show illustrative diagrams of a system for detecting key words and acquiring virtual objects based on the detected key words, in accordance with some embodiments of the disclosure.
Figure 5B:
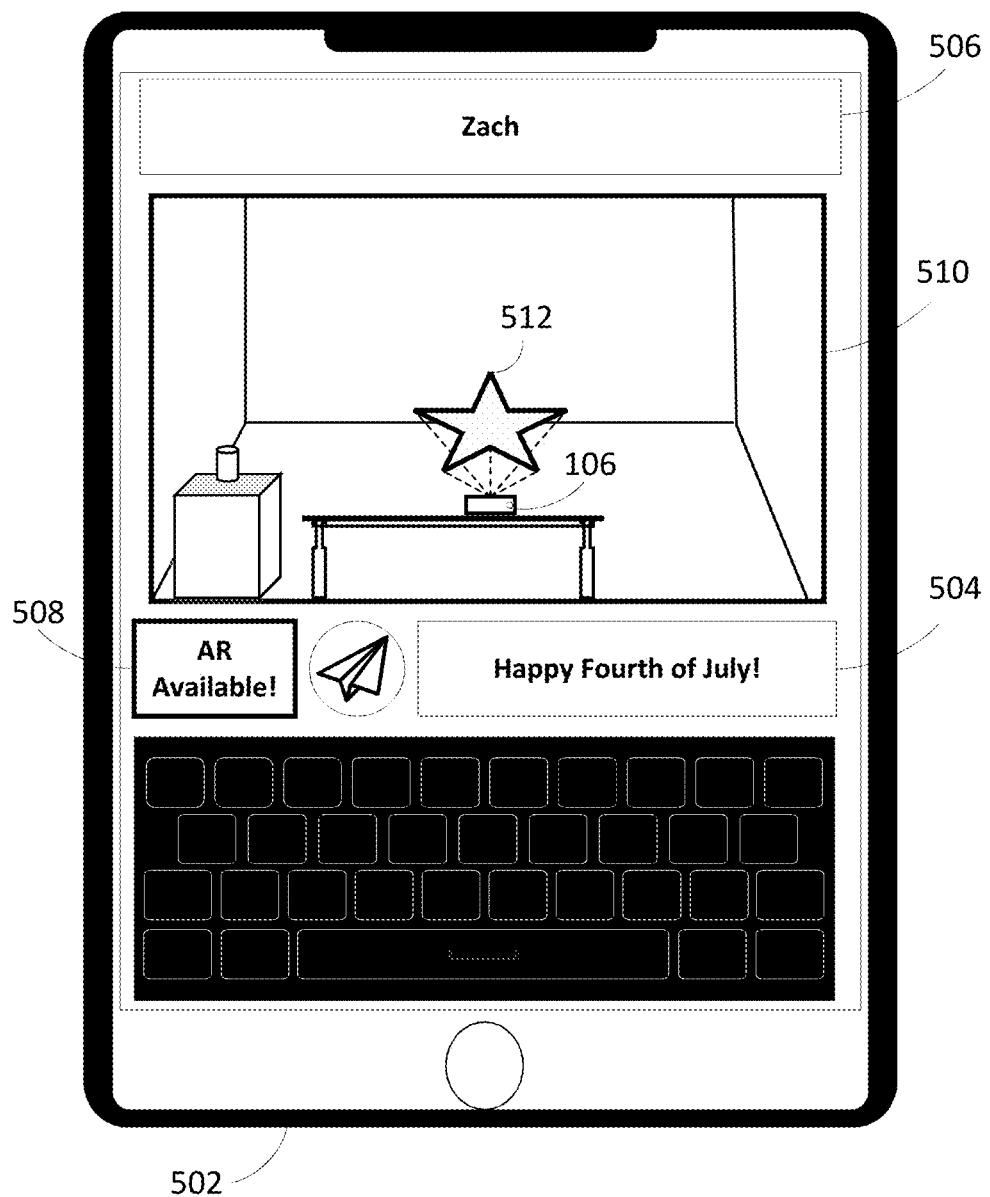

FIGS. 5A and 5B show illustrative diagrams of a system for detecting key words and acquiring virtual objects based on the detected key words, in accordance with some embodiments of the disclosure.

FIG. 5A shows a first device 502 displaying an application (e.g., messaging application). Although a smartphone is displayed, similar such devices (e.g., AR headsets, tablets, desktop computers, televisions, etc.) may be used. In some embodiments, the first device 502 receives one or more inputs corresponding to a message 504. For example, a user may type "Happy Fourth of July!" using the user interface provided by the first device 502. In some embodiments, the first device 502 determines whether the message 504, or portions of the message 504, comprise a word of phrase corresponding to a virtual object. For example, the first device 502 may perform image and/or text recognition on the message 504 and cross-references the message, or one or more portions of the message 504, with a database linking virtual objects to words, phrases, and/or images. In some embodiments, the first device 502 also provides the first user with the ability to select one or more of a plurality of virtual object to send to the second user 506. For example, a first entry in the database may associate a portion of the message 504 with a plurality of virtual objects. The first device 502 may display the plurality of virtual objects and allow the user to select one or more of the displayed plurality of virtual objects to send to the second user 506. In another example, a first portion of the message 504 may be associated with a first virtual object and a second portion of the message 504 may be associated with a second virtual object. The first device 502 may display the first virtual object and the second virtual object for the user. The first device 502 may then send one or more of the displayed virtual objects based on a selection of the user.

In some embodiments, the first device 502 receives a device characteristic of a second device that is associated with a second user 506 who is the intended recipient of the message 504. In some embodiments, the device characteristic indicates whether the second user 506 is using an AR device. For example, the second device (e.g., smartphone) associated with the second user may communicate (e.g., using Bluetooth, Wi-Fi, and/or similar such communication methods) with one or more AR devices and determine that the one or more AR devices are displaying an AR overlay for the second user. In some embodiments, if the second device determines that the second user 506 is using an AR device, the second device may transmit a device characteristic (e.g., indicating that the second user is using an AR device) to the first device 502.

In some embodiments, the first device 502 displays an option 508 to send the message 504 to the second device with a virtual object in response to determining that a portion of the message 504 comprises a word or phrase corresponding to a virtual object and that the second user 506 is using an AR device. In some embodiments, the option 508 is a selectable icon displayed on the first device 502. In some embodiments, if the first user selects the option 508, the first device 502 transmits the message 504 along with an indicator to the second device associated with the second user 506. In some embodiments, the first device 502 does not display the option 508 if the first device 502 determines that the second user 506 is not using an AR device, because there is no way for the second user 506 to view the virtual object.

In some embodiments, the indicator indicates that a portion of the message 504 corresponds to a virtual object. An AR device associated with the second user may display the virtual object in an AR environment based on the second device receiving the message 504 and the indicator. In some embodiments, the indicator is stored in metadata associated with the message. The indicator may also include information about the virtual object. For example, the indicator may include an identifier corresponding to a type of virtual object. In another example, the indicator may include the size, shape, color, animation, sound, speed, direction, start position, end position, and/or similar such attributes relating to the virtual object.

FIG. 5B illustrates the first device 502 displaying the option 508 to send the message 504 to the second device with a virtual object in response to determining that a portion of the message 504 comprises a word or phrase corresponding to a virtual object and that the second user 506 is using an AR device. In some embodiments, the first device 502 also displays an example 510 of how the virtual object 512 will look when displayed by the AR device associated with the second user 506.

In some embodiments, the example 510 displayed by the first device 502 is a generic example of how the virtual object 512 will look when display in an AR environment. In some embodiments, the example 510 is generated based on one or more device characteristics associated with the second user 506. For example, if a device characteristic associated with the second user 506 indicates that the AR device associated with the second user 506 is indoors, the first device 502 may generate an example of the virtual object 512 in a first format in an enclosed environment. In another example, if a device characteristic associated with the second user 506 indicates that the AR device associated with the second user 506 is outdoors, the first device 502 may generate an example of the virtual object 512 in a second format in an outdoor environment. In another example, the first device 502 may receive information relating to the AR environment generated by the AR device associated with the second user 506. The first device 502 may use the received information to customize the example 510 to reflect a version of the AR environment generated by the AR device associated with the second user 506. For example, the example 510 may have the same or similar dimensions and/or objects as what is displayed in the AR environment.

Figure 6:
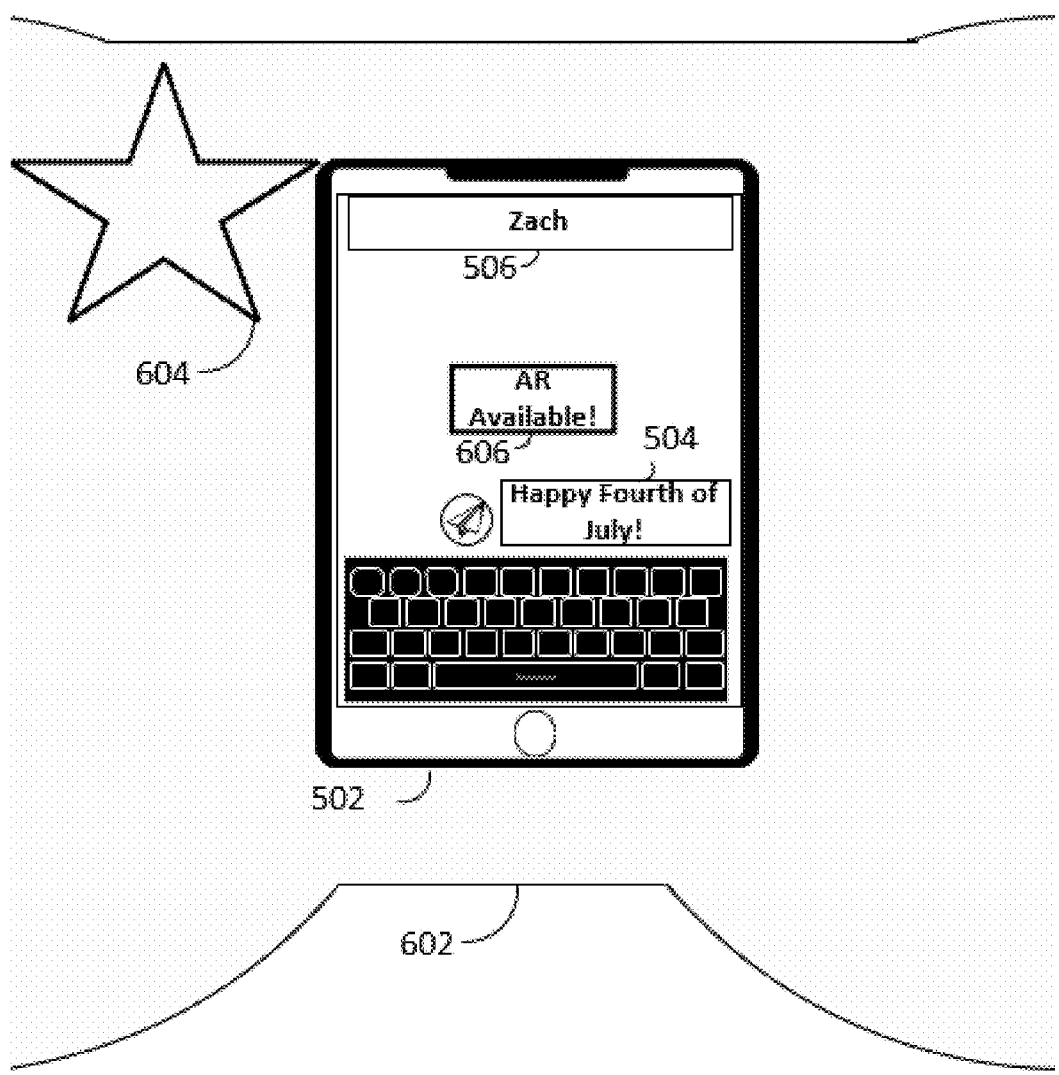
FIG. 6 shows another illustrative diagram of a system for detecting key words and acquiring virtual objects based on the detected key words, in accordance with some embodiments of the disclosure.

FIG. 6 shows another illustrative diagram of a system for detecting key words and acquiring virtual objects based on the detected key words, in accordance with some embodiments of the disclosure. In some embodiments, an AR device 602 displays an an AR environment comprising real-world objects (e.g., first device 502) and AR objects (e.g., virtual object 604). In some embodiments, the AR device 602 corresponds to an AR device of the first user described in FIGS. 5A and 5B.

In some embodiments, the AR device 602 and/or the first device 502 uses one or more of the methodologies described herein to detect and determine that the message 504 corresponds to the virtual object 604. In some embodiments, the AR device 602 displays an option 606 to send the message 504 to the second device with a virtual object 604 in response to determining that a portion of the message 504 comprises a word or phrase corresponding to the virtual object 604 and that the second user 506 is using an AR device. In some embodiments, the option 606 is a selectable icon displayed on the first device 502. In some embodiments, the option 606 is displayed in the AR environment generated by the AR device 602. In some embodiments, the AR device 602 also displays the virtual object 604 in the AR environment generated by the AR device 602 to aid the user in deciding on whether to send the virtual object 604 to the second user 506. In some embodiments, if the first user selects the option 606, the first device 502 transmits the message 504 along with an indicator to the second device associated with the second user 506.

Figure 7:
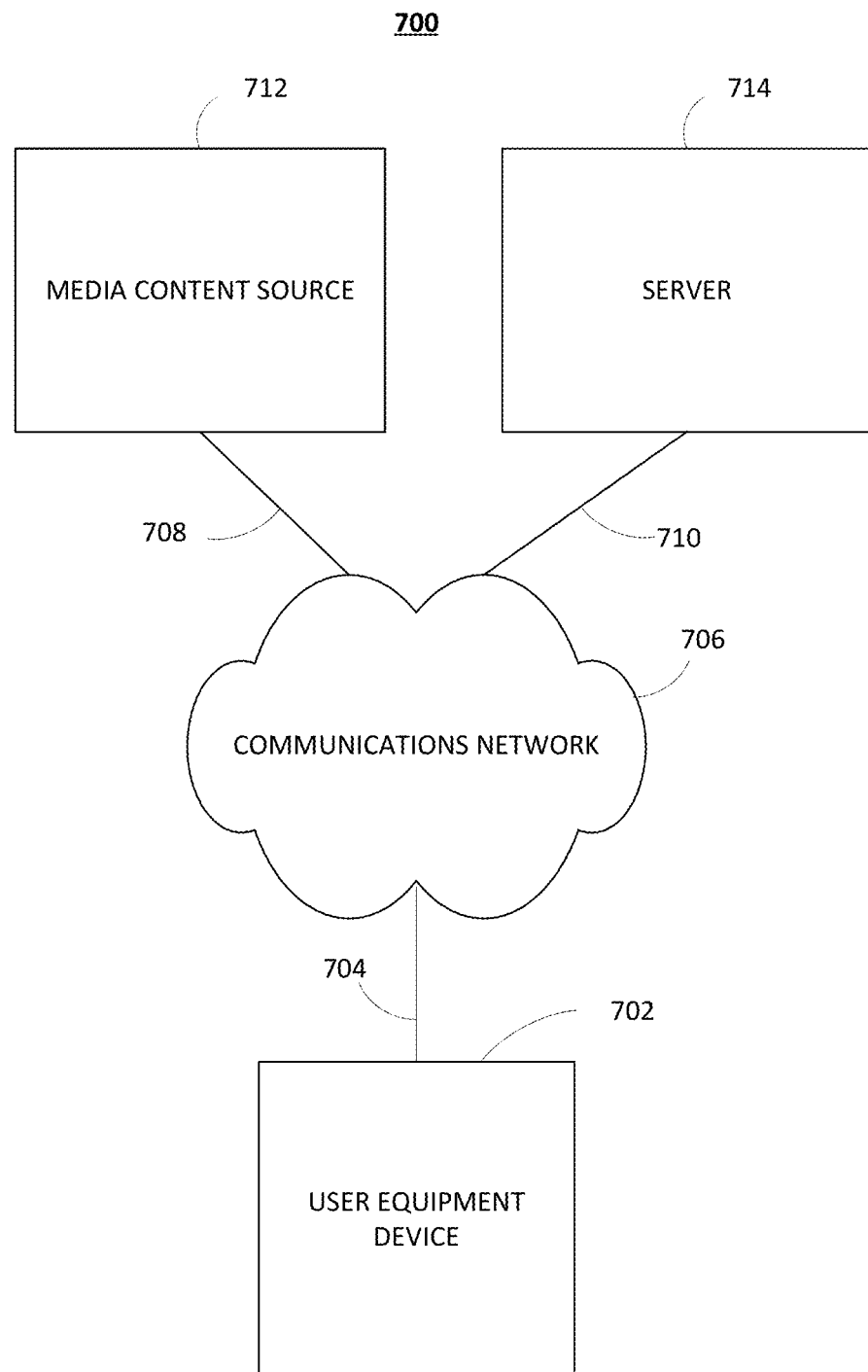
FIG. 7 shows an illustrative block diagram of a media system, in accordance with embodiments of the disclosure.
Figure 8:
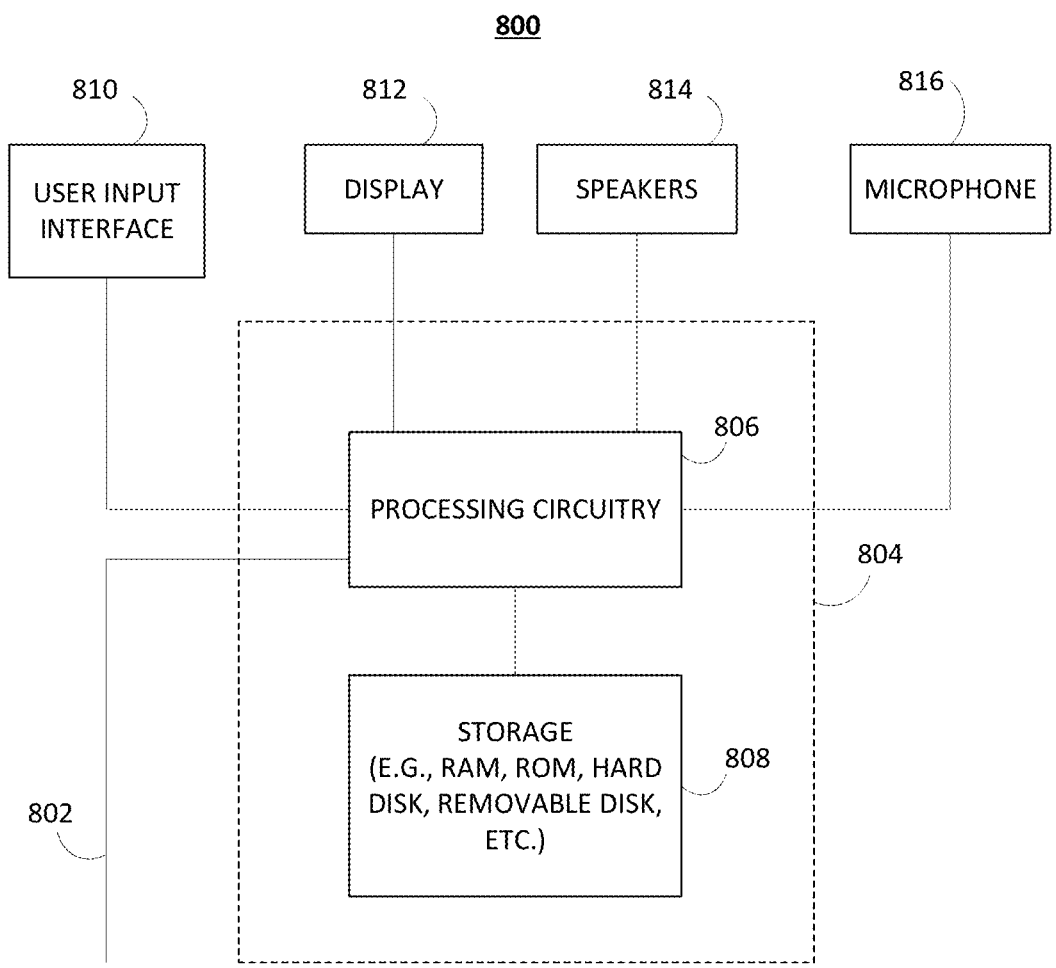
FIG. 8 shows an illustrative block diagram of a user equipment device system, in accordance with some embodiments of the disclosure.

FIGS. 7-8 describe exemplary devices, systems, servers, and related hardware for detecting key words and acquiring virtual objects based on the detected key words, in accordance with some embodiments. In the system 700, there can be more than one user equipment device 702 but only one is shown in FIG. 7 to avoid overcomplicating the drawing. In addition, a user may utilize more than one type of user equipment device 702 and more than one of each type of user equipment device. As described above, the user equipment device 702 may be an AR device and/or an audio output device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 706.

The user equipment devices may be coupled to communications network 706. Namely, the user equipment device 702 is coupled to the communications network 706 via communications path 704. The communications network 706 may be one or more networks including the Internet, a mobile phone network, mobile voice or data network (e.g., a 4G, 5G, or LTE network), cable network, public switched telephone network, or other types of communications network or combinations of communications networks. The path 704 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 704 can be a wireless path. Communication with the user equipment device may be provided by one or more communications paths but is shown as a single path in FIG. 7 to avoid overcomplicating the drawing.

The system 700 also includes media content source 712, and server 714, which can be coupled to any number of databases providing information to the user equipment devices. For example, media content source 712 and server 714 may have access to augmentation data, 2D and/or 3D mapping data, and/or similar such information. The media content source 712 represents any computer-accessible source of content, such as a storage for audio content, metadata, or, similar such information. The server 714 may store and execute various software modules for the detecting key words and acquiring virtual objects based on the detected key words functionality. In some embodiments, the user equipment device 702, media content source 712, and server 714 may store metadata associated with media content.

FIG. 8 shows a generalized embodiment of a user equipment device 800, in accordance with one embodiment. In an embodiment, the user equipment device 800, is an example of the user equipment devices described in FIGS. 1-6 (e.g., AR device 102). The user equipment device 800 may receive content and data via input/output (I/O) path 802. The I/O path 802 may provide audio content (e.g., broadcast programming, on-demand programming, Internet content, content available over a local area network (LAN) or wide area network (WAN), and/or other content) and data to control circuitry 804, which includes processing circuitry 806 and a storage 808. The control circuitry 804 may be used to send and receive commands, requests, and other suitable data using the I/O path 802. The I/O path 802 may connect the control circuitry 804 (and specifically the processing circuitry 806) to one or more communications paths. I/O functions may be provided by one or more of these communications paths but are shown as a single path in FIG. 8 to avoid overcomplicating the drawing.

The control circuitry 804 may be based on any suitable processing circuitry such as the processing circuitry 806. As referred to herein, processing circuitry should be understood to mean circuitry based on one or more microprocessors, microcontrollers, digital signal processors, programmable logic devices, field-programmable gate arrays ("FPGAs"), application-specific integrated circuits ("ASICs"), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The detecting key words and acquiring virtual objects based on the detected key words functionality can be at least partially implemented using the control circuitry 804. The detecting key words and acquiring virtual objects based on the detected key words functionality described herein may be implemented in or supported by any suitable software, hardware, or combination thereof. The providing of augmentation data, 2D data, and/or 3D data can be implemented on user equipment, on remote servers, or across both.

In client-server-based embodiments, the control circuitry 804 may include communications circuitry suitable for communicating with one or more servers that may at least implement the described detecting key words and acquiring virtual objects based on the detected key words. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 808 that is part of the control circuitry 804. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 808 may be used to store various types of content described herein. Nonvolatile memory may also be used (e.g., to launch a boot-up routine and other instructions). Cloud-based storage, described in relation to FIG. 7, may be used to supplement the storage 808 or instead of the storage 808.

The control circuitry 804 may include audio generating circuitry and tuning circuitry, such as one or more analog tuners, audio generation circuitry, filters or any other suitable tuning or audio circuits or combinations of such circuits. The control circuitry 804 may also include scaler circuitry for upconverting and down converting content into the preferred output format of the user equipment device 800. The control circuitry 804 may also include digital-to-analog converter circuitry and analog-to-digital converter circuitry for converting between digital and analog signals. The tuning and encoding circuitry may be used by the user equipment device 800 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 808 is provided as a separate device from the user equipment device 800, the tuning and encoding circuitry (including multiple tuners) may be associated with the storage 808.

The user may utter instructions to the control circuitry 804, which are received by the microphone 816. The microphone 816 may be any microphone (or microphones) capable of detecting human speech. The microphone 816 is connected to the processing circuitry 806 to transmit detected voice commands and other speech thereto for processing. In some embodiments, voice assistants (e.g., Siri, Alexa, Google Home and similar such voice assistants) receive and process the voice commands and other speech.

The user equipment device 800 may optionally include an interface 810. The interface 810 may be any suitable user interface, such as a remote control, mouse, trackball, keypad, keyboard, touch screen, touchpad, stylus input, joystick, or other user input interfaces. A display 812 may be provided as a stand-alone device or integrated with other elements of the user equipment device 800. For example, the display 812 may be a touchscreen or touch-sensitive display. In such circumstances, the interface 810 may be integrated with or combined with the microphone 816. When the interface 810 is configured with a screen, such a screen may be one or more of a monitor, a television, a liquid crystal display ("LCD") for a mobile device, active matrix display, cathode ray tube display, light-emitting diode display, organic light-emitting diode display, quantum dot display, or any other suitable equipment for displaying visual images. In some embodiments, the interface 810 may be HDTV-capable. In some embodiments, the display 812 may be a 3D display. A speaker 814 may be controlled by the control circuitry 804. The speaker (or speakers) 814 may be provided as integrated with other elements of user equipment device 800 or may be a stand-alone unit. In some embodiments, the display 812 may be outputted through speaker 814.

The user equipment device 800 of FIG. 8 can be implemented in system 700 of FIG. 7 as user equipment device 702, but any other type of user equipment suitable detecting key words and acquiring virtual objects based on the detected key words may be used. For example, user equipment devices such as television equipment, computer equipment, wireless user communication devices, or similar such devices may be used. User equipment devices may be part of a network of devices.

Figure 9:
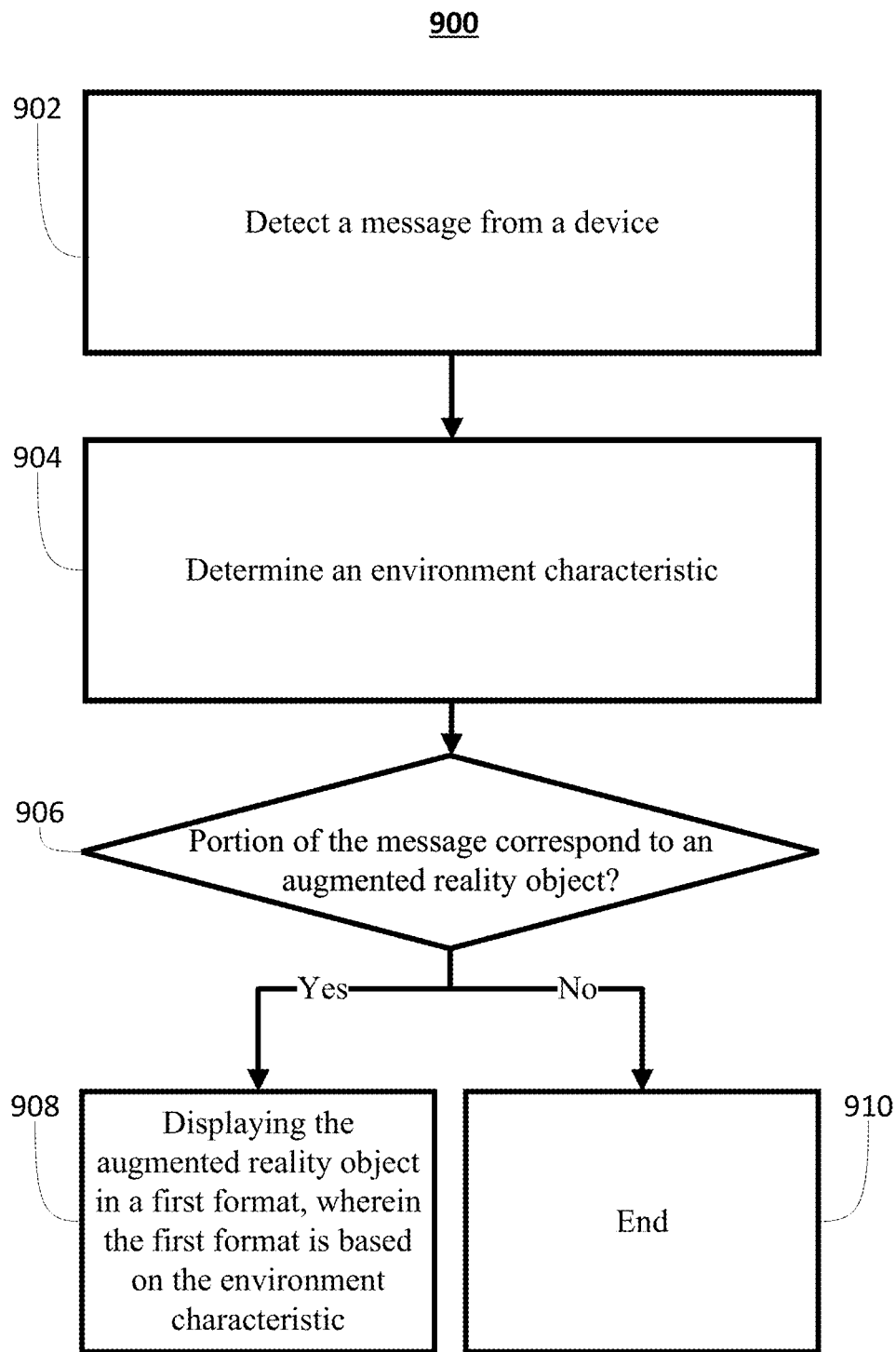
FIG. 9 is an illustrative flowchart of a process for detecting key words provided by ancillary devices and acquiring virtual objects based on the detected key words, in accordance with some embodiments of the disclosure.

FIG. 9 is an illustrative flowchart of a process 900 for detecting key words provided by ancillary devices and acquiring virtual objects based on the detected key words, in accordance with some embodiments of the disclosure. Process 900, and any of the following processes, may be executed by control circuitry 804 on a user equipment device 800. In some embodiments, control circuitry 804 may be part of a remote server separated from the user equipment device 800 by way of a communications network or distributed over a combination of both. In some embodiments, instructions for executing process 900 may be encoded onto a non-transitory storage medium (e.g., the storage 808) as a set of instructions to be decoded and executed by processing circuitry (e.g., the processing circuitry 806). Processing circuitry may, in turn, provide instructions to other sub-circuits contained within control circuitry 804, such as the encoding, decoding, encrypting, decrypting, scaling, analog/digital conversion circuitry, and the like. It should be noted that any of the processes, or any step thereof, could be performed on, or provided by, any of the devices shown in FIGS. 1-8. Although the processes are illustrated and described as a sequence of steps, it is contemplated that various embodiments of the processes may be performed in any order or combination and need not include all the illustrated steps.

At 902, control circuitry detects a message from a device. In some embodiments, the device may be an AR device, smartphone, tablet, desktop, television, and/or similar such devices. In some embodiments, the control circuitry communicates with the device using one or more wired and/or wireless communication protocols. For example, the control circuitry may communicate with the device via a Wi-Fi network.

In some embodiments, the device transmits the message to the control circuitry and/or to a second device within a threshold distance of the control circuitry. In some embodiments, the control circuitry uses one or more methods to detect the message from the device. For example, the control circuitry may detect the message when the control circuitry receives the message from the device. In another example, the control circuitry may use computer vision and/or one or more sensors to detect the message displayed on a screen of the second device. In another example, the control circuitry may receive a notification from the second device indicating the second device received a message. In another example, the control circuitry may detect the message from the device by communicating with an API that notifies that control circuitry that the second device has received a messaged.

At 904, control circuitry determines an environment characteristic. In some embodiments, the environment characteristic relates to the space around the control circuitry. In some embodiments, the control circuitry determines more than one environment characteristic. In some embodiments, the control circuitry uses computer vision, one or more sensors, and/or a profile with stored environment characteristics, to determine environment characteristics. For example, the control circuitry may use a sensor (e.g., a camera) to capture information about the space around the control circuitry and use the information about the space to determine that the that the control circuitry is indoors (e.g., environment characteristic). In some embodiments, the environment characteristic corresponds to one or more dimensions of the space around the control circuitry. For example, the control circuitry may use a sensor (e.g., ultrasonic sensor) to determine that the space around the control circuitry is three meters long, four meters wide, and five meters high. In some embodiments, one or more environment characteristics includes a 2D and/or 3D mapping of the space around the control circuitry. For example, one or more devices may scan the environment around the control circuitry and create a 3D map.

At 906, control circuitry determines whether a portion of the message corresponds to an AR object. In some embodiments, the control circuitry determines whether a portion of the message corresponds to an AR object using one or more databases linking messages or portions of messages to AR objects. For example, the control circuitry may perform image and/or text recognition on the received message and determine that the message contains the phrase "Happy Fourth of July." The control circuitry can cross-reference the portion of the message ("Happy Fourth of July") with the one or more databases to determine if one or more AR objects correspond to the portion of the message. In some embodiments, the message and/or portions of the message relate to an application. For example, the message may be displayed as part of a social media platform. When the second device displays the message of the social media platform, the control circuitry may use the one or more databases to determine if the message corresponds to an AR object. If the control circuitry determines that a portion of the message does correspond to an AR object, then the process 900 continues to step 908. If the control circuitry determines that a portion of the message does not correspond to an AR object, then the process 900 ends at step 910 and no AR object is displayed.

At 908, control circuitry displays the AR object in a first format, wherein the first format is based on the environment characteristic. In some embodiments, the format corresponds to the size, shape, color, animation, sound, speed, direction, start position, end position, and/or similar such attributes related to AR objects. In some embodiments, the control circuitry accesses one or more databases with entries linking one or more environment characteristics with formats of AR objects. For example, a first entry may associate an environment characteristic (e.g., control circuitry being indoors) with a first format and a second entry may associate a second environment characteristic (e.g., control circuitry being outdoors) with a second format. In another example, a first entry may associate a first environment characteristic (e.g., control circuitry being indoors) and a second characteristic (e.g., a second user being within a threshold distance of the control circuitry) with a first format and a second entry may associate the first environment characteristic and a third environment characteristic (e.g., a second user not being within the threshold distance of the control circuitry) with a second format. Accordingly, if the control circuitry determines that the control circuitry is indoors and a second user is within a threshold distance of the control circuitry, the control circuitry may display the AR object in the first format.

In some embodiments, when determining a format for displaying the AR object, the environment characteristic relates to one or more devices (e.g., second device associated with the AR object) shown in an AR environment. For example, the control circuitry may use computer vision to determine the angle of incident between the frontal plane of a device displaying the AR environment for the user and the display of the additional device associated with the AR object. The control circuitry may then determine a first format for the AR object based on the determined angle of incident. In another example, the second device may transmit the location of the second device to the control circuitry. The control circuitry may then determine a first format for the AR object based on the location of the second device.

In some embodiments, when determining a format for displaying the AR object, the environment characteristic relates to a 2D and/or 3D mapping of the space around the control circuitry. For example, the control circuitry may use a 3D map of the space around the control circuitry to determine a real-world object in the space around the control circuitry. The control circuitry may then determine a first format for the AR object, wherein the first format animates the AR object to avoid a collision between the animation of the AR object and the real-world object.

Once the control circuitry determines a format for the AR object, the control circuitry displays the AR object in an AR environment. In some embodiments, the control circuitry determines the format for the AR object and then displays the AR object in the determined format according to one or more factors. For example, the control circuitry may determine a size (e.g., first format) of the AR object based on the control circuitry being indoors (e.g., first factor). The control circuitry may then display the AR object in the AR environment so that the AR object has the same orientation as the orientation of the second device (e.g., second factor). The control circuitry displaying the AR object in the AR environment so that the AR object has the same orientation as the orientation of the second device may simulate that the AR object is originating from the second device.

Figure 10:
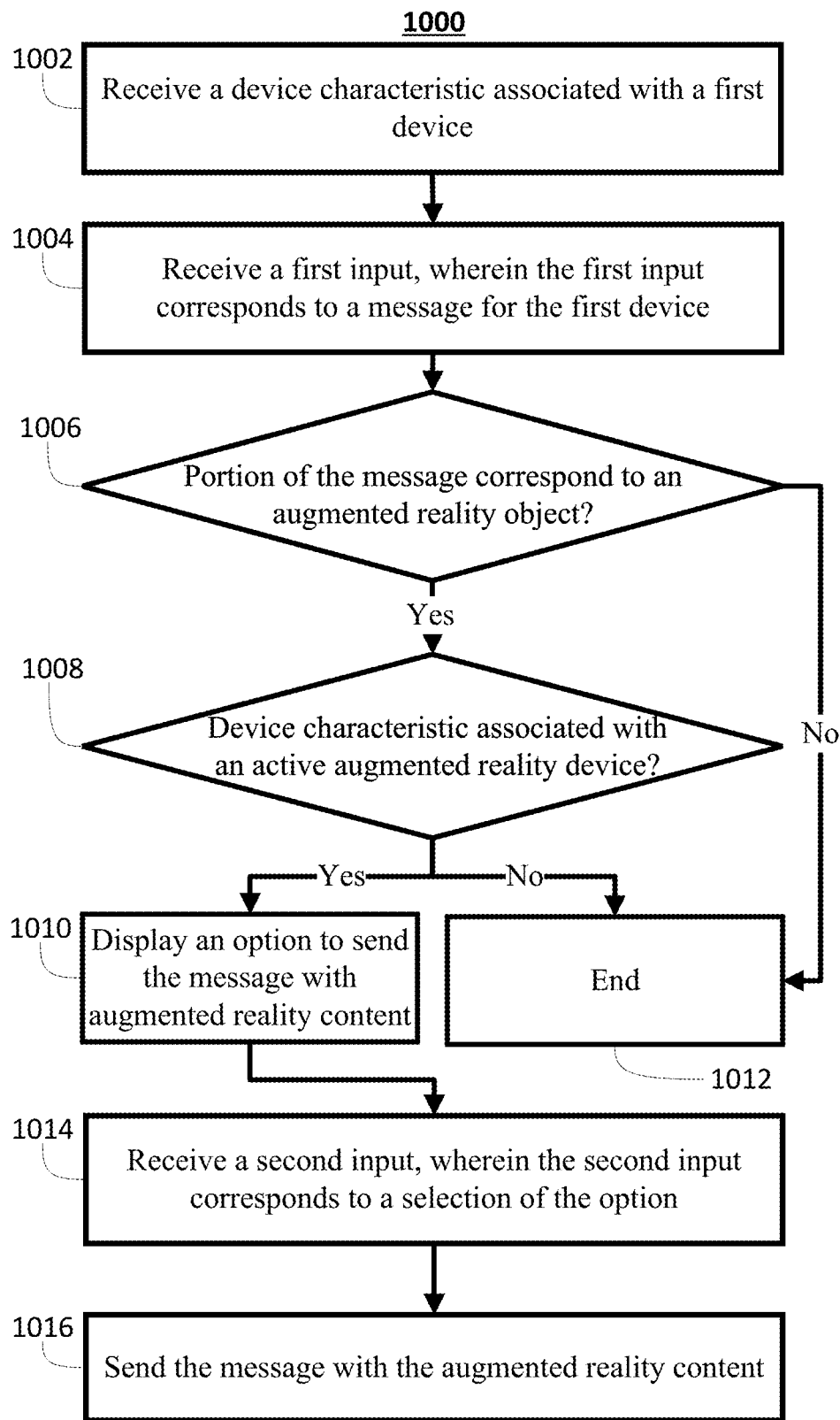
FIG. 10 is an illustrative flowchart of a process for detecting key words and acquiring virtual objects based on the detected key words, in accordance with some embodiments of the disclosure.

FIG. 10 is an illustrative flowchart of a process 1000 for detecting key words and acquiring virtual objects based on the detected key words, in accordance with some embodiments of the disclosure. Like the process 900, the process 1000 may be executed by control circuitry 804 on a user equipment device 800, and the user equipment device 800 may be configured in a manner similar to that described regarding the process 900 to implement the process 900.

At 1002, control circuitry receives a device characteristic associated with a first device. In some embodiments, the device characteristic indicates whether a user is using an AR device. For example, the first device may be an AR device and the device characteristic indicates whether the first device is displaying an AR view. In some embodiments, an AR view is an AR environment and/or a portion of an AR environment. In another example, the first device may be in communication with a second device that is an AR device, and the device characteristic indicates whether the second device is active (e.g., connected to a network, powered on, worn by a user, etc.). In some embodiments, the first device may be associated with the user and may be in communication (e.g., using Bluetooth, Wi-Fi, and/or similar such communication methods) with one or more other devices also associated with the user. The one or more other devices associated with the user may communicate one or more device characteristics to the first device. In some embodiments, if the first device determines that any of the devices associated with the user are displaying an AR view for the user and/or are active, then the first device transmits one or more device characteristics (e.g., indicating that the second user is using an AR device, indicating that an AR device associated with the user is active, etc.) to the control circuitry.

At 1004, control circuitry receives a first input, wherein the first input corresponds to a message for the first device. In some embodiments, the control circuitry receives the first input when a user types in a message using a user input interface (e.g., user input interface 810). For example, the user may type "Happy Fourth of July!" using a touch screen. In some embodiments, the control circuitry receives the first input when the control circuitry detects the user's speech using a microphone (e.g., microphone 816). For example, the user may say "happy fourth of July!" or "Send message to Zach saying happy fourth of July."

At 1006, control circuitry determines whether a portion of the message corresponds to an augmented reality object. In some embodiments, the control circuitry determines whether a portion of the message corresponds to an AR object using one or more databases linking messages or portions of messages to AR objects. For example, the control circuitry may perform image and/or text recognition on the received message and determine that the message contains the phrase "Happy Fourth of July." The control circuitry can cross-reference the portion of the message ("Happy Fourth of July") with the one or more databases to determine if one or more AR objects correspond to the portion of the message. If the control circuitry determines that a portion of the message does correspond to an AR object, then the process 1000 continues to step 1008. If the control circuitry determines that a portion of the message does not correspond to an AR object, then the process 1000 ends at step 1012.

At 1008, control circuitry determines whether the device characteristic is associated with an active augmented reality device. In some embodiments, the device characteristic indicates whether the first device and/or any devices associated with the user of the first device are displaying an AR view. In some embodiments, the device characteristic indicates whether any of devices (e.g., the first device and/or any devices associated with the user) associated with the user are active AR devices. If the control circuitry determines that the device characteristic is associated with an active augmented reality device, then the process 1000 continues to step 1010. If the control circuitry determines that the device characteristic is not associated with an active augmented reality device, then the process 1000 ends at step 1012.

At 1010, control circuitry displays an option to send the message with augmented reality content. In some embodiments, the option is a selectable icon displayed by a display (e.g., display 812). In some embodiments, the option is an AR object displayed in an AR view by the display. In some embodiments, the control circuitry also displays an example of how the AR object will look when displayed by an AR view associated with the user of the first device. In some embodiments, the control circuitry displays a generic example of how the AR object may look in an AR view. In some embodiments, the control circuitry generates an example based on one or more device characteristics received in step 1002. For example, if a device characteristic indicates that the AR view generated for the user of the first device is indoors with certain dimensions, the control circuitry may generate an example showing the AR object in a first format in an enclosed environment with the same or similar dimensions to the AR view generated for the user (e.g., FIG. 5B). In another example, if a device characteristic indicates that the AR view generated for the user of the first device is outdoors, the control circuitry may generate an example of the AR object in a second format in an outdoor environment. In some embodiments, the control circuitry generates an option that allows a user to select an AR object. For example, the option may provide a plurality of AR objects for the user to select. In some embodiments, the control circuitry determines the plurality of AR objects using the same or similar methodologies described in step 1006 above.

At 1014, control circuitry receives a second input, wherein the second input corresponds to a selection of the option. In some embodiments, the control circuitry receives the second input when a user selects the option using the user input interface (e.g., user input interface 810). For example, the user may click on the option using a touch screen. In some embodiments, the control circuitry receives the second input when the control circuitry detects the user's speech using a microphone (e.g., microphone 816). For example, the user may say "send with AR content."

At 1016, control circuitry sends the message with AR content to the first device. In some embodiments the AR content comprises one or more AR objects determined in step 1006. In some embodiments, the control circuitry sends the message with AR content by sending the message with an indicator indicating that a portion of the message corresponds to an AR object. In some embodiments, one or more devices display the AR object in an AR view based on receiving the message and the indicator. For example, if the first device is displaying the AR view, the first device may display the message and the AR object in response to receiving the message with the indicator. In another example, if an additional device associated with the first device is displaying the AR view, the additional device may display the message and the AR object in response to detecting the first device receiving the message with the indicator. In some embodiments, the additional device may detect that the first device received the message with the indicator after receiving a notification from the first device. In some embodiments, the indicator is stored in metadata associated with the message. The indicator may also include information about the AR object. For example, the indicator may include an identifier corresponding to a type of AR object. In another example, the indicator may include the size, shape, color, animation, sound, speed, direction, start position, end position, and/or similar such attributes relating to the AR object.

It is contemplated that some suitable steps or suitable descriptions of FIGS. 9-10 may be used with other suitable embodiments of this disclosure. In addition, some suitable steps and descriptions described in relation to FIGS. 9-10 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-8 could be used to perform one or more of the steps in FIGS. 9-10.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting, by a first device, a message received from a second device;
   detecting, by the first device, that a portion of the message corresponds to an augmented reality object;
   determining, by the first device, at least one display format of a plurality of display formats for the augmented reality object, wherein:
      a first display format of the plurality of display formats corresponds to a first environment characteristic;
      a second display format of the plurality of display formats corresponds to a second environment characteristic; and
      the first display format is different than the second display format;
   detecting, by the first device, a first trait of a space around the first device;
   selecting, by the first device, the first display format based, at least in part, on the first trait matching the first environment characteristic; and
   in response to selecting the first display format, displaying, by the first device, the augmented reality object in an augmented reality view in a first format.

2. The method of claim 1, wherein:
   the first environment characteristic relates to the first device being located in a moving vehicle;
   the second environment characteristic relates to the first device being stationary; and
   the first trait indicates that the first device is located within a moving vehicle.

3. The method of claim 2, wherein:
   the first display format corresponds to an icon; and
   the second display format corresponds to an animated graphic.

4. The method of claim 3, further comprising:
   detecting, by the first device, a second trait of the space around the first device, wherein the second trait is detected after the first trait and the second trait indicates that the device is stationary; and
   displaying, by the first device, the augmented reality object in an augmented reality view in the second display format, wherein the second display format corresponds to the animated graphic.

5. The method of claim 1, wherein:
   the first environment characteristic relates to the first device being within a threshold distance of the second device;
   the second environment characteristic relates to the first device being outside the threshold distance of the second device; and
   the first trait indicates that the first device is located within the threshold distance of the second device.

6. The method of claim 1, wherein:
   the first environment characteristic relates to the first device being located outside;
   the second environment characteristic relates to the first device being located inside; and
   the first trait indicates that the first device is located outside.

7. The method of claim 1, wherein:
   the first display format corresponds to an animated graphic; and
   the second display format corresponds to an icon.

8. The method of claim 1, wherein detecting the first trait of the space around the first device further comprises determining, by the first device, a device characteristic of the second device.

9. The method of claim 8, wherein:
   the first environment characteristic relates to a display of the second device having a first orientation relative to the first device;
   the second environment characteristic relates to the display of the second device having a second orientation relative to the first device; and
   the first trait corresponds to the device characteristic indicating that the display of the second device has the first orientation relative to the first device.

10. An apparatus comprising:
    control circuitry; and
    at least one memory including computer program code for one or more programs, the at least one memory and the computer program code configured to, with the control circuitry, cause the apparatus to perform at least the following:
       detect a message received from a device;
       detect that a portion of the message corresponds to an augmented reality object;

determine at least one display format of a plurality of display formats for the augmented reality object, wherein:
  a first display format of the plurality of display formats corresponds to a first environment characteristic;
  a second display format of the plurality of display formats corresponds to a second environment characteristic; and
  the first display format is different than the second display format;
detect a first trait of a space around the apparatus;
select the first display format based, at least in part, on the first trait matching the first environment characteristic; and
in response to selecting the first display format, display the augmented reality object in an augmented reality view in a first format.

11. The apparatus of claim 10, wherein:
the first environment characteristic relates to the apparatus being located in a moving vehicle;
the second environment characteristic relates to the apparatus being stationary; and
the first trait indicates that the apparatus is located within a moving vehicle.

12. The apparatus of claim 11, wherein:
the first display format corresponds to an icon; and
the second display format corresponds to an animated graphic.

13. The apparatus of claim 12, wherein the apparatus is further caused to:
detect a second trait of the space around the apparatus, wherein the second trait is detected after the first trait and the second trait indicates that the apparatus is stationary; and
display the augmented reality object in an augmented reality view in the second display format, wherein the second display format corresponds to the animated graphic.

14. The apparatus of claim 10, wherein: the first environment characteristic relates to the device being within a threshold distance of the apparatus;
the second environment characteristic relates to the device being outside the threshold distance of the apparatus; and
the first trait indicates that the device is located within the threshold distance of the apparatus.

15. The apparatus of claim 10, wherein:
the first environment characteristic relates to the apparatus being located outside;
the second environment characteristic relates to the apparatus being located inside; and
the first trait indicates that the apparatus is located outside.

16. The apparatus of claim 10, wherein:
the first display format corresponds to an animated graphic; and
the second display format corresponds to an icon.

17. A non-transitory computer-readable medium having instructions encoded thereon that, when executed by control circuitry, cause the control circuitry to:
detect a message received from a device;
detect that a portion of the message corresponds to an augmented reality object;
determine at least one display format of a plurality of display formats for the augmented reality object, wherein:
  a first display format of the plurality of display formats corresponds to a first environment characteristic;
  a second display format of the plurality of display formats corresponds to a second environment characteristic; and
  the first display format is different than the second display format;
detect a first trait of a space around the control circuitry;
select the first display format based, at least in part, on the first trait matching the first environment characteristic; and
in response to selecting the first display format, display the augmented reality object in an augmented reality view in a first format.

* * * * *

UNITED STATES PATENT AND TRADEMARK OFFICE
CERTIFICATE OF CORRECTION

PATENT NO. : 12,223,604 B2
APPLICATION NO. : 18/082113
DATED : February 11, 2025
INVENTOR(S) : Charles Dasher et al.

It is certified that error appears in the above-identified patent and that said Letters Patent is hereby corrected as shown below:

In the Claims

Claim 1, Column 20, Line 3, please delete "a first format" and replace it with --the first display format--.

Claim 4, Column 20, Line 21, please delete "an augmented reality view" and replace it with --the augmented reality view--.

Claim 10, Column 21, Line 18, please delete "a first format" and replace it with --the first display format--.

Claim 13, Column 21, Lines 36-37, please delete "an augmented reality view" and replace it with --the augmented reality view--.

Signed and Sealed this
Twenty-fifth Day of March, 2025

Coke Morgan Stewart
*Acting Director of the United States Patent and Trademark Office*